(12) United States Patent
Fürstenberger et al.

(10) Patent No.: US 11,267,133 B2
(45) Date of Patent: Mar. 8, 2022

(54) ROBOT ARM WITH AT LEAST ONE JOINT TORQUE SENSOR

(71) Applicant: KUKA Deutschland GmbH, Augsburg (DE)

(72) Inventors: Matthias Fürstenberger, Stadtbergen (DE); Moritz Zasche, Eggenthal (DE); Bernhard Koegl, Mering (DE); Rainer Krumbacher, Rettenbach (DE); Michael Marquart, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 17/267,222

(22) PCT Filed: Jul. 31, 2019

(86) PCT No.: PCT/EP2019/070648
§ 371 (c)(1),
(2) Date: Feb. 9, 2021

(87) PCT Pub. No.: WO2020/030498
PCT Pub. Date: Feb. 13, 2020

(65) Prior Publication Data
US 2021/0308873 A1 Oct. 7, 2021

(30) Foreign Application Priority Data
Aug. 9, 2018 (DE) ..................... 10 2015 213 452.9

(51) Int. Cl.
*B25J 19/02* (2006.01)
*B25J 13/08* (2006.01)
(Continued)

(52) U.S. Cl.
CPC ........... *B25J 13/085* (2013.01); *B25J 9/1025* (2013.01); *B25J 17/00* (2013.01); *B25J 19/0075* (2013.01)

(58) Field of Classification Search
CPC ...... B25J 13/085; B25J 17/00; B25J 17/0241; B25J 19/0075; B25J 9/1025
See application file for complete search history.

(56) References Cited

U.S. PATENT DOCUMENTS 10,759,048 B2 * 9/2020 Nagata .................. B25J 9/1633
11,092,225 B2 * 8/2021 Mendel ................ F16H 49/001

FOREIGN PATENT DOCUMENTS

EP  1503196 A1  2/2005
EP  1353159 B1  2/2006
(Continued)

OTHER PUBLICATIONS

European Patent Office; Search Report in related International Patent Application No. PCT/EP2019/070648 dated Nov. 25, 2019; 2 pages.

*Primary Examiner* — Randell J Krug
(74) *Attorney, Agent, or Firm* — Dorton & Willis, LLP

(57) ABSTRACT

A robot arm has a transmission output-side mating running surface on which a dynamic contact seal that seals off the transmission casing in a lubricant-tight manner is seated. A gap is determined by a main bearing arrangement between an upstream link and a downstream link, to which an output flange of a joint torque sensor is coupled, is sealed off by means of a further dynamic seal, with the objective of increasing the accuracy of the torque measurement by optimizing the secondary force flows.

15 Claims, 2 Drawing Sheets

(51) Int. Cl.
*B25J 9/10* (2006.01)
*B25J 17/00* (2006.01)
*B25J 19/00* (2006.01)

(56) References Cited

FOREIGN PATENT DOCUMENTS

| | | | |
|---|---|---|---|
| EP | 3162516 | A2 | 5/2017 |
| JP | 2017034936 | A | 2/2017 |
| KR | 20130017122 | A | 2/2013 |

\* cited by examiner

ROBOT ARM WITH AT LEAST ONE JOINT TORQUE SENSOR

CROSS-REFERENCE TO RELATED APPLICATIONS

This application is a national phase application under 35 U.S.C. § 371 of International Patent Application No. PCT/EP2019/070648, filed Jul. 31, 2019 (pending), which claims the benefit of priority to German Patent Application No. DE 10 2018 213 452.9, filed Aug. 9, 2018, the disclosures of which are incorporated by reference herein in their entirety.

TECHNICAL FIELD

The present invention relates generally to robotic manipulators and, more particularly, to a robot arm having improved joint torque determination.

BACKGROUND

For example, from EP 1 353 159 B1 and EP 1 503 196 A1, a device is known in each case comprising a transmission with a ring gear to which an electric motor used as a drive is assigned. A torque sensor forms a unit with the ring gear of a harmonic drive gear or planetary gear. The torque sensor is designed in the form of a monolithic disk-shaped receiving part made up of an annular inner flange with first force introduction points, an annular outer flange with second force introduction points and radially extending connecting webs formed between the two flanges, each with a mechanically weakened portion at which pressure-sensitive or strain-sensitive measuring sensors, which generate electrical output signals, are provided. According to the principle of a Wheatstone bridge, the measuring sensors are each connected to quarter, half or full bridges in such a way that a torque can be determined, the receiving part having a coherent, articulated flat upper face, and the mechanically weakened portions of the connecting webs being designed as recesses on the underside, each with a thin membrane-like closure, the measuring sensors being mounted on the flat upper face of the membrane-like closures.

SUMMARY

The object of the invention is to create a robot arm in which the determination, in particular the measurement of a joint torque, is improved and in particular can be carried out more precisely by means of at least one joint torque sensor.

This object is inventively achieved by a robot arm comprising a plurality of links and a plurality of joints which connect the links to one another in an adjustable manner, at least one downstream link being rotatably mounted on an upstream link by means of a main bearing arrangement, a transmission casing of a respective transmission in the relevant joint being coupled to the upstream link, and a joint torque sensor, which is designed to detect a torque on the output side, being connected to an output shaft of the transmission, the joint torque sensor having an input flange, an output flange and a measuring portion connecting the input flange to the output flange on which at least one torque sensor measuring element is arranged, furthermore comprising a transmission output-side mating running surface on which a dynamic contact seal, which seals off the transmission casing in a lubricant-tight manner, is seated, wherein a gap, which is determined by the main bearing arrangement, between the upstream link and the downstream link, to which the output flange of the joint torque sensor is coupled, is sealed off by means of a further seal.

The inventive features pursue in particular the objective of increasing the accuracy of the torque measurement by optimizing the secondary force flows.

In general, the further seal can be arranged at any point in the region of the transmission output. It is important, however, that the arrangement of the further seal is chosen so that the further seal is arranged in the torque flow in front of the at least one torque sensor measuring element so that the further seal does not form a secondary force flow that could deflect the measurement by the at least one torque sensor measuring element.

The object is achieved in particular by a robot arm comprising a plurality of links and a plurality of joints which connect the links to one another in an adjustable manner, at least one downstream link being rotatably mounted on an upstream link by means of a main bearing arrangement, a transmission casing of a respective transmission being coupled to the upstream link in the relevant joint and a joint torque sensor, which is designed to detect a torque on the output side, being connected to an output shaft of the transmission, the joint torque sensor having an input flange, an output flange and a measuring portion connecting the input flange to the output flange and on which at least one torque sensor measuring element is arranged, furthermore having a coupling portion which couples the input flange of the joint torque sensor to the output shaft of the transmission and which has a mating running surface on which a dynamic contact seal, which seals off the transmission casing in a lubricant-tight manner, is seated, wherein a gap, which is determined by the main bearing arrangement, between the upstream link and the downstream link, to which the output flange of the joint torque sensor is coupled, is sealed off in particular in a dust-tight manner by means of the further dynamic, in particular contactless, seal.

With robots and in particular with sensitive robots, that is, robots controlled for flexibility or stiffness, a torque sensor or joint torque sensor (JTS) is generally integrated into the relevant robot joint, in particular together with a drive motor, a transmission and a main bearing for the joint. The joint torque sensor is only loaded with a torque, apart from any secondary load components that at most may occur due to deformations of the main bearing and attached parts. Tilting moments and other forces are transmitted via the main bearing. The exclusive torque load is the main advantage compared to a sequential arrangement of motor and transmission including main bearing and joint torque sensor.

Usually the complete robot joint including the main bearing and toothing, i.e. gears, is jointly sealed off. In the case of robot joints having integrated joint torque sensors, a substantial disadvantage is that the secondary force flow resulting from the seal friction can distort the measurement of the torque.

This secondary force flow can impair the measurement accuracy on the order of up to several percent of the nominal torque. Therefore, a special main focus in the joint design is inventively on reducing the seal friction. On the one hand, this focus represents an additional cost factor if the minimization of friction is to be achieved with high-quality materials and/or coatings, and, on the other hand, there is a conflict of objectives between high sealing effect and high measuring accuracy. In fact, both cannot be ideally achieved at the same time.

The aim of the invention can therefore be to create a seal for a robot joint with integrated joint torque sensors having a better sealing effect, but without the torque measurement being distorted.

An analysis of the main force flows and secondary force flows under the possible operating conditions has inventively shown that distortion of the torque measurement can be prevented by separating a seal for the transmission from a seal for the main bearing.

The seal of the transmission can inventively be arranged between the transmission and the joint torque sensor, for example directly connected to a flex spline of a harmonic drive transmission. The transmission can thus be sealed between a main bearing inner ring and an inner flange of the joint torque sensor. A complete sealing of the transmission can thus be achieved. Typical frictional torques from contacting seals amount to one to two percent of the nominal torque of the joint torque sensor. However, the seal does not represent a secondary force flow that influences the torque measurement. The torque measurement takes place in the force flow only after the transmission has been sealed. The torque applied to the structural part of the robot arm, that is to say to an link of the robot arm, is thus measured almost completely by the joint torque sensor, thus only minus a theoretical secondary force flow of the main bearing.

However, the requirements for sealing the main bearing are significantly lower than for the transmission seal. For example, only a minimal, i.e. lower, amount of grease is required, and the grease can also have a lower viscosity. It is even possible to use contactless seals, such as cover disks, which only represent a minimal secondary force flow and have almost no influence on the torque measurement. Due to this principle, the secondary force flow due to the bearing friction indeed cannot be prevented. However, this friction can be significantly minimized. The decisive factor is the friction of the seal.

For sensitive robots, a joint seal with simultaneously high measuring accuracy of the torque measurement is of central importance. With the inventive solution of types of seals on the transmission and, separately, another type of seal on the main bearing, a full sealing of the transmission and thus the joint is achieved without the torque measurement being significantly affected.

The main bearing arrangement can comprise one or more roller bearings which are designed for mounting the link located downstream of a joint in the kinematic chain of the robot arm adjustably with respect to an link located upstream of this joint. The joint can preferably be a swivel joint. Accordingly, the main bearing arrangement can be designed to mount the link which is located downstream in the kinematic chain of the robot arm with respect to a joint so as to be rotatable on an link upstream of this joint. Due to the main bearing arrangement, a gap is accordingly formed between the downstream link and the upstream link, because the adjustability of the downstream link with respect to the upstream link must be ensured. The gap is thus formed by two opposite end walls of the upstream link and the downstream link. Due to the main bearing arrangement with one or more roller bearings, at least one roller bearing ring is connected to the upstream link and the other roller bearing ring of the same roller bearing is connected to the downstream link. Accordingly, the aforementioned gap can also be formed by an inner ring and an outer ring of a roller bearing. The contactless seal can thus be arranged in particular between an inner ring and an outer ring of a roller bearing of the main bearing arrangement.

The downstream link, which is adjustably mounted by means of the main bearing arrangement, is driven by a motor, in particular an electric motor. The motor can in particular be arranged in the upstream link. The motor generates a drive torque, which is preferably transmitted to the downstream link via a gear. The transmission has a transmission casing. Because the transmission generally comprises at least one roller pair that is designed to be lubricated, the transmission casing is used to, among other things, enclose grease and/or oil within the transmission casing. The sealing of gaps is critical, in particular in the region of a transmission casing passage both at an input link of the transmission and at an output link of the transmission. These gaps between the transmission casing and the input link or the output link are accordingly sealed in a lubricant-tight manner by means of dynamic contact seals. In the case of a harmonic drive transmission, the input link of the transmission can be part of a wave generator of the harmonic drive transmission. In the case of a harmonic drive transmission, the output link of the transmission can be part of a flex spline of the harmonic drive transmission.

A lubricant-tight seal is understood in particular to mean that, depending on the type of transmission and its lubricant, be it grease and/or oil, the dynamic contact seals can seal in such a way that grease and/or oil is at least approximately or completely prevented from escaping from the gaps between the transmission casing and the input link or output link.

The output link of the transmission can form the output shaft of the transmission or can be connected to it. For example, in the case of a harmonic drive transmission, the output link or the output shaft can be formed by a flex spline of the harmonic drive transmission or preferably be directly connected to it.

The joint torque sensor comprises the input flange, the output flange and at least one, in particular a plurality of, measuring portions. At least one joint torque sensor can be present at each joint of the robot arm. Each joint torque sensor can have a monolithic block, which in this respect can comprise the input flange, the output flange and the at least one, in particular the plurality of, measuring portions. The input flange can in particular be formed by an inner ring part of the block, the output flange can be formed by an outer ring part of the block, the inner ring part and the outer ring part being connected via a plurality of spoke portions. The spoke portions are parts of the measuring portions. Each spoke portion carries at least one, in particular a plurality of, measuring sensors, such as strain gauges (DMS). The joint torque sensor can, for example, be designed analogously to EP 1 353 159 B1 and EP 1 503 196 A1.

The coupling portion forms a torque-transmitting connection between the output link of the transmission and the input flange of the joint torque sensor. The coupling portion can, for example, be a separate component that can be detachably connected on the one hand to the output link of the transmission and on the other hand to the input flange of the joint torque sensor. Alternatively, the coupling portion can be a part of the output link of the transmission or can be formed in one piece with the output link of the transmission. Again, alternatively, the coupling portion can be part of the input flange of the joint torque sensor or can be formed in one piece with the input flange of the joint torque sensor.

The dynamic contact seal that seals the transmission casing in a lubricant-tight manner can be designed as at least one radial shaft sealing ring.

The radial shaft sealing ring can have one sealing lip or a plurality of sealing lips which bear against the mating running surface of the coupling portion. Instead of a single radial shaft sealing ring, two or more radial shaft sealing rings can also be provided.

In a first embodiment variant, the coupling portion can be formed on the output shaft of the transmission and the mating running surface against which a sealing lip of the radial shaft sealing ring bears can be formed by a casing wall of the output shaft. In this embodiment variant, the coupling portion is a sub-portion of the output shaft of the transmission.

In a second embodiment variant, the coupling portion can be formed on the input flange of the joint torque sensor and the mating running surface against which a sealing lip of the radial shaft sealing ring bears can be formed by a casing wall of the input flange of the joint torque sensor. In this embodiment variant, the coupling portion is a sub-portion of the input flange of the joint torque sensor.

In a third embodiment variant, the coupling portion can be designed as a separate component, which is attached to the input flange of the joint torque sensor and/or to the output shaft of the transmission, and the mating running surface against which a sealing lip of the radial shaft sealing ring bears can be formed by a casing wall of the separate component. In this embodiment variant, the coupling portion designed as a separate component can be screwed, for example by means of bolts, to the input flange of the joint torque sensor on the one hand and to the output shaft of the transmission on the other hand.

The dynamic, contactless seal that seals the gap between the upstream link and the downstream link in a dust-tight manner can be designed as at least one gap seal or labyrinth seal. The gap seal or labyrinth seal can either be arranged between an inner ring of a roller bearing of the main bearing arrangement and an outer ring of the roller bearing of the main bearing arrangement or it can be arranged between the upstream link and the downstream link of the relevant joint.

The dynamic, contactless seal that seals the gap between the upstream link and the downstream link, in particular in a dust-tight manner, can be designed as at least one sealing washer of the main bearing arrangement. The at least one sealing washer can in particular be arranged between an inner ring of a roller bearing of the main bearing arrangement and an outer ring of the roller bearing of the main bearing arrangement. In this respect, the sealing washer can be part of the roller bearing.

The robot arm can generally have a plurality of motors, each of which is designed to adjust one of the joints by the motor, together with its motor casing, being fixed to an link of the robot arm upstream of the respective joint, a motor shaft of the motor being coupled to an input link of the transmission which has an output link that is coupled to an link of the robot arm downstream of the respective joint, by the output link forming the output shaft of the transmission and being coupled to the input flange of the joint torque sensor via the coupling portion. The motors can preferably be electric motors. The robot arm can in particular have an inventive seal arrangement at each of its joints.

The respective transmission casing can be sealed in a lubricant-tight manner with respect to the motor shaft by means of at least one further dynamic contact seal. The transmission thus has a transmission casing. Because the transmission, as already mentioned, generally comprises at least one roller pair that is designed to be lubricated, the transmission casing serves, among other things, to enclose grease and/or oil within the transmission casing. The sealing of gaps is critical, in particular in the region of a transmission casing passage both at an input link of the transmission and at an output link of the transmission. These gaps between the transmission casing and the input link or the output link are accordingly sealed in a lubricant-tight manner by means of dynamic contact seals.

A lubricant-tight seal is understood in particular to mean that, depending on the type of transmission and its lubricant, be it grease and/or oil, the dynamic contact seals can seal in such a way that grease and/or oil is at least approximately or completely prevented from escaping from the gaps between the transmission casing and the input link or output link.

The at least one further dynamic contact seal can be designed as a further radial shaft sealing ring. The further radial shaft sealing ring can have a sealing lip or a plurality of sealing lips which bear against the motor shaft. Instead of a single radial shaft sealing ring, two or more radial shaft sealing rings can also be provided.

It can be provided that the transmission casing is dynamically sealed against leakage of lubricant, such as grease and/or transmission oil, exclusively by means of the dynamic contact seal that bears against the coupling portion and the further dynamic contact seal that bears against the motor shaft. It can be provided that the transmission casing does not have any dynamic contact seals that go beyond this.

The dynamic, contactless seal, which seals the gap determined by the main bearing arrangement between the upstream link and the downstream link that is coupled to the output flange of the joint torque sensor, in particular in a dust-tight manner, can be the only seal of the relevant joint that seals the gap.

Regardless of whether the respective gap of the relevant joint of the robot arm determined by the main bearing arrangement is sealed by means of a single dynamic, contactless seal or is sealed by means of two or more dynamic contactless seals, an inventive effect is possibly achieved to a sufficient extent even if a completely contactless seal is not used, but instead a different contacting seal is used that in some cases seals to a lesser extent and has a significantly reduced friction compared to a general contact seal, and in particular compared to a known radial shaft sealing ring. There is a significant reduction in particular if the friction of the seal on the main bearing arrangement is higher than a dynamic, contactless seal, but the friction of the seal on the main bearing arrangement is still more than 50% less than the contact seal used on the transmission and associated with the relevant joint, such as a known radial shaft sealing ring. Such seals are sometimes also referred to as reduced-friction seals. Such seals can, for example, be seals in the form of a radial shaft sealing ring which, however, is then designed without a spiral-type expander and thus has significantly less pressure on the associated shaft. If necessary, the seal can also be designed as a felt ring which surrounds the associated shaft approximately flush without radial pressure.

The dynamic contact seal that bears against the coupling portion can be attached to a first support ring which is connected to an inner ring of the main bearing.

The output flange of the joint torque sensor can be attached to a second support ring, which is connected to an outer ring of the main bearing.

A specific embodiment of the invention is explained in more detail in the following description with reference to the accompanying figures. Specific features of this exemplary embodiment can represent general features of the invention regardless of the specific context in which they are mentioned, possibly also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
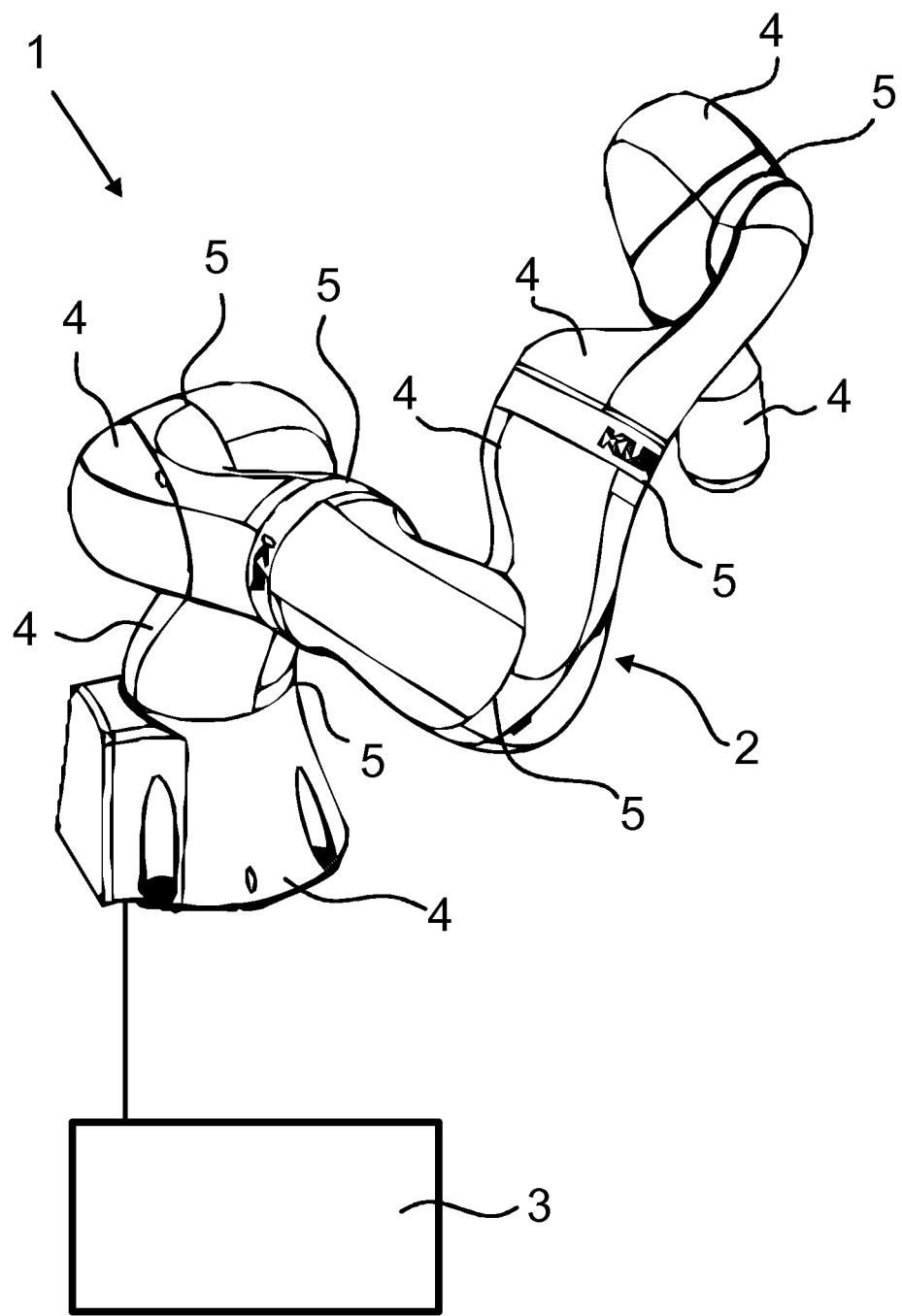
FIG. 1 is a schematic representation of an exemplary robot arm comprising a plurality of links and joints.
Figure 2:
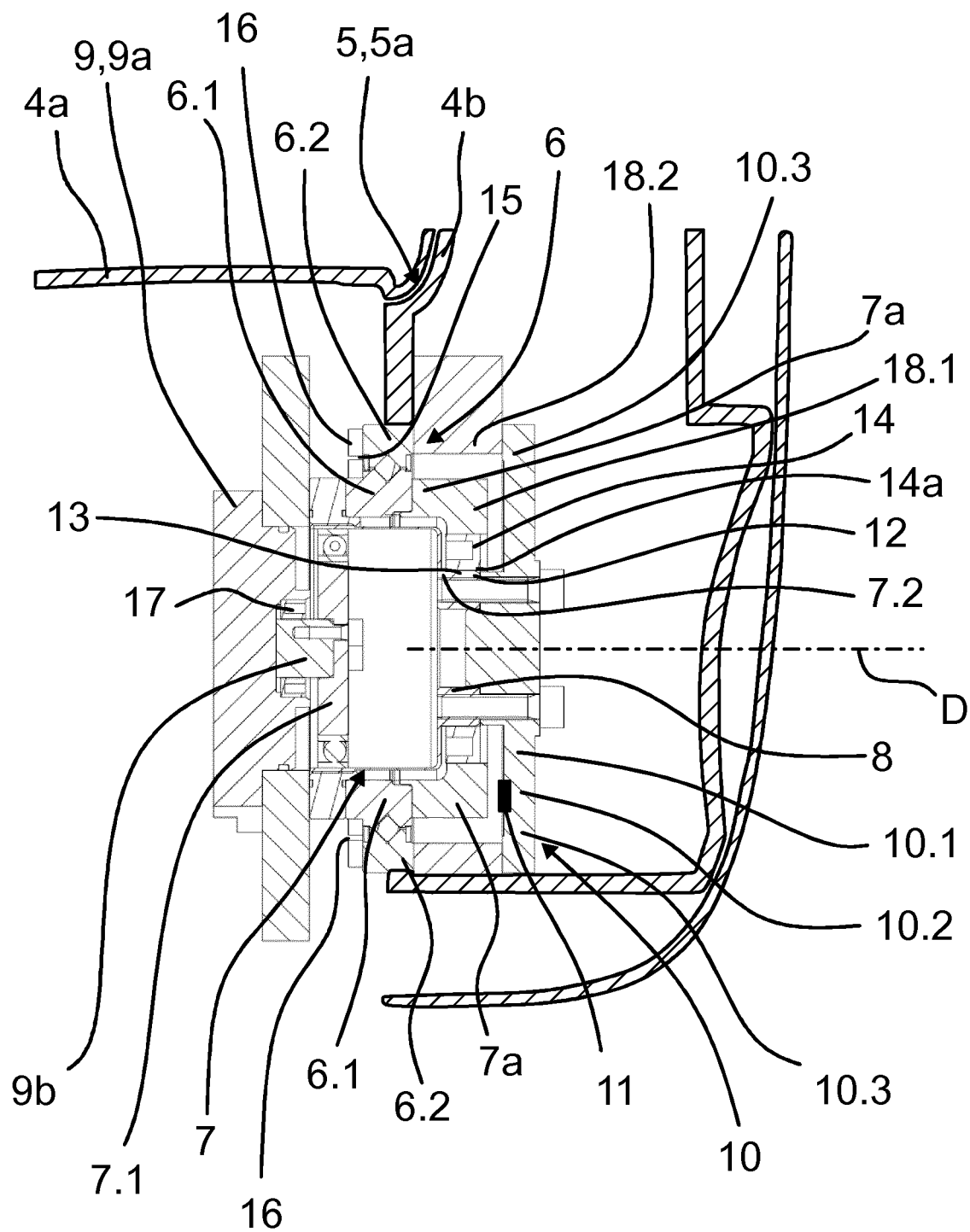
FIG. 2 is a sectional view of a representative joint of the inventive robot arm according to FIG. 1.

In the case of the embodiment in FIG. 1, a robot 1 has a robot arm 2 with an associated robot controller 3. The robot arm 2 has a plurality of links 4 and joints 5 which adjust the links 4 relative to one another. Each joint 5 is driven by a motor 9 (FIG. 2) of the robot arm 2. The robot controller 3 is designed and configured for controlling the motors 9 in order to move the links 4 of the robot arm 2 by automatically adjusting the joints 5. The robot arm 2 has at least one joint 5 which has an inventive joint sealing arrangement, which is shown in more detail in section in FIG. 2. In the case of the present embodiment, all joints 5 of the robot arm 2 are designed as swivel joints 5a. In the case of the present embodiment, each swivel joint 5a is rotatable about an axis of rotation D (FIG. 2) and has an inventive joint sealing arrangement.

The robot arm 2 has a plurality of motors 9 which are each designed to adjust one of the joints 5 by the motor 9, together with its motor casing 9a, being fixed to an link 4a of the robot arm 2 upstream of the respective joint 5 and a motor shaft 9b of the motor 9 being coupled to an input link 7.1 of the transmission 7 which has an output link 7.2 that is coupled to an link 4b of the robot arm 2 downstream from the respective joint 5, by the output link 7.2 forming the output shaft 8 of the transmission 7 and being coupled via the coupling portion 12 to the input flange 10.1 of the joint torque sensor 10.

The robot arm 2 accordingly has a plurality of links 4 and a plurality of joints 5 which connect the links 4 so that they can be adjusted relative to one another, in each case a downstream link 4b being rotatably mounted on an upstream link 4a by means of a main bearing arrangement 6, a transmission casing 7a of a respective transmission 7 in the relevant joint 5 being coupled to the downstream link 4b, and a joint torque sensor 10 being connected to an output shaft 8 of the transmission 7 and being designed to detect a torque on the output side, the joint torque sensor 10 having an input flange 10.1, an output flange 10.3 and measuring portion 10.2 connecting the input flange 10.1 to the output flange 10.3 and on which at least one torque sensor measuring element 11 is arranged, further comprising a coupling portion 12 which couples the input flange 10.1 of the joint torque sensor 10 to the output shaft 8 of the transmission 7 and has a mating running surface 13 on which a dynamic contact seal 14, which seals off the transmission casing 7a in a lubricant-tight manner, is seated, wherein a gap 15, which is determined by the main bearing arrangement 6, between the upstream link 4a and the downstream link 4b, to which the output flange 10.3 of the joint torque sensor 10 is coupled, is sealed off by means of a dynamic, contactless seal 16 in a dust-tight manner.

In the case of the present embodiment, the dynamic contact seal 14 that seals the transmission casing 7a in a lubricant-tight manner is designed as at least one radial shaft sealing ring.

The coupling portion 12 is formed on the input flange 10.1 of the joint torque sensor 10 and the mating running surface 13, against which a sealing lip 14a of the radial shaft sealing ring bears, is formed by a casing wall of the input flange 10.1 of the joint torque sensor 10.

The dynamic, contactless seal 16 sealing the gap 15 between the upstream link 4a and the downstream link 4b in a dust-tight manner is designed as at least one gap seal, labyrinth seal or in particular as at least one sealing washer.

In the case of the present embodiment, the respective transmission casing 7a is sealed in a lubricant-tight manner with respect to the motor shaft 9b by means of at least one further dynamic contact seal 17. In the case of the present embodiment, the at least one further dynamic contact seal 17 is designed as a further radial shaft sealing ring.

The transmission casing 7a is dynamically sealed against leakage of transmission oil exclusively by means of the dynamic contact seal 14, which bears against the coupling portion 12, and the further dynamic contact seal 17, which bears against the motor shaft 9b.

The dynamic, contactless seal 16, which seals the gap 15 determined by the main bearing arrangement 6 between the upstream link 4a and the downstream link 4b, to which the output flange 10.3 of the joint torque sensor 10 is coupled in a dust-tight manner, is the only seal of the relevant joint 5 that seals the gap 15.

The dynamic contact seal 14, which bears against the coupling portion 12, is fastened to a first support ring 18.1, which is connected to an inner ring 6.1 of the main bearing 6.

The output flange 10.3 of the joint torque sensor 10 is fastened to a second support ring 18.2, which is connected to an outer ring 6.2 of the main bearing 6.

What is claimed is:

1. A robot arm, comprising:
a plurality of links and a plurality of joints connecting the links for adjustment relative to one another;
each joint comprising a main bearing arrangement and a transmission;
at least one downstream link being rotatably mounted on an upstream link by the main bearing arrangement of the associated joint;
the upstream link coupled to a transmission housing of the transmission of the associated joint; and
a joint torque sensor connected to an output shaft of the transmission and configured to detect a torque on an output side of the transmission;
the joint torque sensor comprising:
an input flange,
an output flange coupled with the downstream link, and
a measuring portion connecting the input flange to the output flange,
at least one torque sensor measuring element arranged on the output flange,
a first dynamic contact seal seated on a transmission output-side mating running surface of the transmission and sealing off the transmission housing in a lubricant-tight manner, and
a second dynamic seal sealing off a gap determined by the main bearing arrangement, between the upstream link and the downstream link.

2. The robot arm of claim 1, further comprising:
a coupling portion coupling the input flange of the joint torque sensor to the output shaft of the transmission;
the coupling portion having the transmission output-side mating running surface on which the first dynamic contact seal is seated; and wherein the second dynamic seal is at least one of contactless or configured to seal the gap in a dust-tight manner.

3. The robot arm of claim 1, wherein the dynamic contact seal sealing the transmission housing is configured as at least one radial shaft sealing ring.

4. The robot arm of claim 2, wherein:
the dynamic contact seal sealing the transmission housing is configured as at least one radial shaft sealing ring having a sealing lip;
the coupling portion is formed on the output shaft of the transmission; and
the mating running surface, against which the sealing lip of the radial shaft sealing ring bears, is formed by a casing wall of the output shaft.

5. The robot arm of claim 2, wherein:
the dynamic contact seal sealing the transmission housing is configured as at least one radial shaft sealing ring having a sealing lip;
the coupling portion is formed on the input flange of the joint torque sensor; and
the mating running surface, against which the sealing lip of the radial shaft sealing ring bears, is formed by a casing wall of the input flange of the joint torque sensor.

6. The robot arm of claim 2, wherein:
the dynamic contact seal sealing the transmission housing is configured as at least one radial shaft sealing ring having a sealing lip;
the coupling portion is configured as a separate component that is fastened to at least one of the input flange of the joint torque sensor or to the output shaft of the transmission; and
the mating running surface, against which the sealing lip of the radial shaft sealing ring bears, is formed by a casing wall of the separate component.

7. The robot arm of claim 1, wherein:
the second dynamic seal is a contactless seal configured to seal the gap in a dust-tight manner; and
the second dynamic seal is configured as at least one gap seal or labyrinth seal.

8. The robot arm of claim 1, wherein:
the second dynamic seal is a contactless seal configured to seal the gap in a dust-tight manner; and
the second dynamic seal is configured as at least one sealing washer of the main bearing arrangement.

9. The robot arm of claim 1, further comprising:
a plurality of motors, each configured to adjust a respective one of the joints;
wherein each motor comprises:
a motor housing fixed to a link of the robot arm that is upstream of the respective joint, and
a motor shaft coupled with an input link of the transmission of the respective joint; and
wherein an output link of the respective transmission is coupled with a link of the robot arm that is downstream of the respective joint, in that the output link forms the output shaft of the transmission and is coupled with the input flange of the joint torque sensor via a coupling portion.

10. The robot arm of claim 9, wherein the respective transmission housing is sealed in a lubricant-tight manner with respect to the motor shaft by at least one third dynamic contact seal.

11. The robot arm of claim 10, wherein the at least one third dynamic contact seal is configured as a radial shaft sealing ring.

12. The robot arm of claim 10, wherein the transmission housing is dynamically sealed against leakage of transmission oil exclusively by the first dynamic contact seal, which bears against the coupling portion, and the third dynamic contact seal, which bears against the motor shaft.

13. The robot arm of 1, wherein the gap between the upstream link and the downstream link is only sealed by the second dynamic seal, and is sealed in a contactless and dust-tight manner.

14. The robot arm of claim 1, further comprising:
a coupling portion coupling the input flange of the joint torque sensor to the output shaft of the transmission; and
wherein the first dynamic contact seal bears against the coupling portion and is attached to a first support ring that is connected to an inner ring of the main bearing arrangement.

15. The robot arm of claim 1, wherein the output flange of the joint torque sensor is attached to a second support ring that is connected to an outer ring of the main bearing arrangement.

* * * * *